US011120378B1

(12) United States Patent
Willard, III et al.

(10) Patent No.: US 11,120,378 B1
(45) Date of Patent: *Sep. 14, 2021

(54) SYSTEM AND METHOD FOR PERFORMING BULK PICK OF ITEMS OF A CUSTOMER ORDER

(71) Applicant: America's Collectibles Network, Inc., Knoxville, TN (US)

(72) Inventors: George F. Willard, III, Knoxville, TN (US); Mahendra Satrasala, Knoxville, TN (US); Lei Cao, Oak Ridge, TN (US); G. Shannon Meade, Knoxville, TN (US); Bradley K. Waller, Lenoir City, TN (US); Matthew Cardwell, Knoxville, TN (US)

(73) Assignee: America's Collectibles Network, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,897

(22) Filed: Jul. 17, 2019

Related U.S. Application Data

(60) Provisional application No. 62/700,619, filed on Jul. 19, 2018.

(51) Int. Cl.
*G06Q 10/00* (2012.01)
*G06Q 10/06* (2012.01)
(Continued)

(52) U.S. Cl.
CPC ....... *G06Q 10/06315* (2013.01); *G06F 16/29* (2019.01); *G06F 16/9024* (2019.01);
(Continued)

(58) Field of Classification Search
None
See application file for complete search history.

(56) References Cited

U.S. PATENT DOCUMENTS

| 7,346,564 B1 * | 3/2008 | Kirklin | G06Q 10/087 |
| | | | 705/26.1 |
| 7,739,138 B2 * | 6/2010 | Chauhan | G06Q 10/06 |
| | | | 705/7.14 |

(Continued)

OTHER PUBLICATIONS

Zhao, X. (2011). A business process driven approach for automatic generation of business applications (Order No. NR78480). Available from ProQuest Dissertations and Theses Professional. (Year: 2011) (Year: 2011).*

(Continued)

*Primary Examiner* — Gurkanwaljit Singh
(74) *Attorney, Agent, or Firm* — Nelson Mullins Riley & Scarborough LLP; Anthony A. Laurentano

(57) ABSTRACT

A customer order fulfillment system comprising an order collection unit for collecting information associated with a plurality of customer orders and generating related customer order data. The system also includes an order generating unit for receiving the customer order data from the order collection unit and generating in response thereto consolidated order fulfillment data, and a bulk pick order fulfillment unit for receiving the consolidated order fulfillment data from the order generating unit and grouping together similar ones of the items associated with the customer orders to form a plurality of bulk picks, wherein one or more of the bulk picks can form part of one or more bulk pick tours. The system further includes a pick tour generating unit for receiving the consolidated order fulfillment data from the order generating unit and for generating pick tour instructions associated with a pick tour from the consolidated order fulfillment data.

18 Claims, 8 Drawing Sheets

(51) Int. Cl.
  *G06Q 10/08* (2012.01)
  *G06Q 10/10* (2012.01)
  *G06F 16/29* (2019.01)
  *G06F 16/901* (2019.01)
  *G06Q 30/06* (2012.01)
  *G06Q 10/04* (2012.01)

(52) U.S. Cl.
  CPC ....... *G06F 16/9027* (2019.01); *G06Q 10/047* (2013.01); *G06Q 10/06316* (2013.01); *G06Q 10/083* (2013.01); *G06Q 10/0875* (2013.01); *G06Q 10/10* (2013.01); *G06Q 30/0635* (2013.01)

(56) References Cited

U.S. PATENT DOCUMENTS

| | | | | |
|---|---|---|---|---|
| 7,853,492 B1* | 12/2010 | Kirklin | ................ | G06Q 10/087 705/28 |
| 8,175,925 B1* | 5/2012 | Rouaix | ................ | G06Q 20/20 705/22 |
| 8,401,975 B1* | 3/2013 | Tian | ................ | G06Q 10/08 705/335 |
| 8,407,110 B1* | 3/2013 | Joseph | ................ | G06Q 30/0633 705/28 |
| 9,466,045 B1* | 10/2016 | Kumar | ................ | G06Q 10/087 |
| 9,602,381 B1* | 3/2017 | Jordan | ................ | G06Q 10/08 |
| 10,489,802 B1* | 11/2019 | Zhdanov | ................ | G06Q 30/0202 |
| 2008/0301009 A1* | 12/2008 | Plaster | ................ | G06Q 10/087 705/28 |
| 2011/0055289 A1* | 3/2011 | Ennis | ................ | G06Q 10/06 707/805 |
| 2011/0261049 A1* | 10/2011 | Cardno | ................ | G06Q 10/10 345/419 |
| 2014/0040075 A1* | 2/2014 | Perry | ................ | G06Q 30/0635 705/26.81 |
| 2016/0217399 A1* | 7/2016 | Roelofs | ................ | G06Q 10/08355 |
| 2019/0213530 A1* | 7/2019 | Wolf | ................ | G06Q 10/043 |
| 2020/0265381 A1 | 8/2020 | Willard, III et al. | | |
| 2020/0272970 A1 | 8/2020 | Willard, III et al. | | |
| 2020/0311644 A1 | 10/2020 | Willard, III et al. | | |

OTHER PUBLICATIONS

Kim, B. S. (2009). Dynamic slotting and cartonization problem in zone-based carton picking systems (Order No. 3394621). Available from ProQuest Dissertations and Theses Professional (Year: 2009) (Year: 2009).*

Ow Yong, M. G. (2009). Order batching design for a modular fulfillment center (Order No. 3418241). Available from ProQuest Dissertations and Theses Professional (Year: 2009) (Year: 2009).*

Frazelle, E. H. (1989). Stock location assignment and order picking productivity (Order No. 9120762). Available from ProQuest Dissertations and Theses Professional (Year: 1989) (Year: 1989).*

Van den Berg, Jeroen P., and Willem HM Zijm. "Models for warehouse management: Classification and examples." International journal of production economics 59.1-3 (1999): 519-528. (Year: 1999) (Year: 1999).*

Accorsi, Riccardo, Riccardo Manzini, and Fausto Maranesi. "A decision-support system for the design and management of warehousing systems." Computers in Industry 65.1 (2014): 175-186. (Year: 2014) (Year: 2014).*

* cited by examiner

Bulk Pick Ticket

SYSTEM AND METHOD FOR PERFORMING BULK PICK OF ITEMS OF A CUSTOMER ORDER

RELATED APPLICATION

The present application claims priority to provisional patent application Ser. No. 62/700,619, filed on Jul. 19, 2018, and entitled SYSTEM AND METHOD FOR PERFORMING BULK PICK OF ITEMS OF A CUSTOMER ORDER, the contents of which are herein incorporated by reference.

BACKGROUND OF THE INVENTION

Vendors, particularly in home shopping industries involving telephone ordering, mail ordering, or e-commerce, often need to fulfill and package customer orders to be shipped to customers. The customer order may include one or more product items, as well as promotional literature. In some circumstances, product fulfillment and packaging may be done manually with a worker picking items corresponding to the customer order from a fulfillment center or warehouse and then inserting orders into packages. In order to increase efficiency over conventional manual picking and packaging techniques, automated picking stations and packing machines have been introduced. However, such picking processes are designed to have a person simply pick an item from a selected location and then transfer the item to a packing station for packaging, without regard to optimizing the pick route or picking and packaging process.

Further, conventional item picking and packaging systems require large capital investments, and still are not fully adapted to optimize the item picking and packaging process.

SUMMARY OF THE INVENTION

The present invention is directed to an order fulfillment system that receives and processes customer orders, and then determines whether the specific items in the collected customer orders warrant the creation and execution of bulk pick. If the system determines that a series of bulk picks (e.g., bulk pick wave) are required, then the system generates a series of bulk pick recipes that include a selected collection of items to be picked, generates a bulk pick ticket associated with each bulk pick, and then the picks are sent to a pick agent or to an automated system.

According to one embodiment, the present invention is directed to a customer order fulfillment system comprising an order collection unit for collecting information associated with a plurality of customer orders from a plurality of customers and generating customer order data that includes data associated with each of the plurality of customer orders and the plurality of customers, wherein each of the plurality of customer order includes one or more items associated therewith. The system also includes an order generating unit for receiving the customer order data from the order collection unit and generating in response thereto consolidated order fulfillment data, and a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours. The system further includes a pick tour generating unit for receiving the consolidated order fulfillment data from the order generating unit and for generating pick tour instructions associated with a pick tour from the consolidated order fulfillment data.

According to the system of the present invention, the bulk pick order fulfillment unit groups the items in the consolidated order fulfillment data into shipments according to one or more predetermined logical parameters. Further, the bulk pick order fulfillment unit includes processing hardware that is configured to: map the one or more items in each of the plurality of customer orders to product identification data; generate one or more bulk picks having associated therewith one or more bulk pick recipes from the data associated with the customer orders, wherein each of the bulk pick recipes includes a selected quantity of the one or more items from the plurality of customer orders and a selected quantity of one or more additional items; and generate a bulk pick ticket associated with each of the bulk picks.

According to the present invention, the bulk pick ticket includes information about the one or more items in the bulk pick recipe, and location information associated with the location of the one or more items in the warehouse.

According to other aspects of the present invention, the bulk pick order fulfillment unit generates a connected graph of groupings of the items from the customer orders and the one or more additional items, wherein the items from the customer orders and the additional items form nodes of the connected graph.

According to still other aspects, the order generating unit generates a tree map for visually displaying on a display device selected consolidated order fulfillment data. The tree map comprises a plurality of configurable and selectable parameters for allowing a user to select parameters associated with the customer orders, and wherein the selectable parameters include one or more of: a selected warehouse, the maximum number of items per bulk pick ticket, the minimum shipment count per bulk pick recipe, or the maximum number of recipes per bulk pick.

The customer order fulfillment system of the present invention further comprises an automated fulfillment sub-system for automatically retrieving the items that form the bulk pick or that form the pick tour, and/or a packing and shipping sub-system for packing and shipping the items from the customer orders. The system can also employ a controller for scheduling one or more selected time periods for performing the bulk pick tours.

According to another practice, the present invention is directed to a computer-implemented method comprising collecting information associated with a plurality of customer orders from a plurality of customers and generating customer order data that includes data associated with each of the plurality of customer orders and the plurality of customers, wherein each of the plurality of customer order includes one or more items associated therewith; generating in response to the customer order data consolidated order fulfillment data; grouping together similar ones of the items associated with the plurality of customer orders to form a plurality of bulk picks, wherein one or more of the plurality of bulk picks can form part of one or more bulk pick tours; and generating pick tour instructions associated with a pick tour from the consolidated order fulfillment data.

The computer-implemented method further comprises grouping the items in the consolidated order fulfillment data into shipments according to one or more predetermined logical parameters.

According to another practice, the computer-implemented method of the present invention includes mapping customer items in the customer orders to product identification data; generating one or more bulk picks having one or more bulk pick recipes from the data associated with the customer orders, wherein each of the bulk pick recipes includes a selected quantity of one or more items from the customer orders and a selected quantity of one or more additional items; and generating a bulk pick ticket associated with each of the bulk picks. The bulk pick tickets includes information about the one or more items in the bulk pick recipe, and data associated with the location of the one or more items in the warehouse.

The computer-implemented method can also include generating a connected graph of groupings of the items from the customer orders and the one or more additional items, wherein the items from the customer orders and the additional items form nodes of the connected graph, and/or generating a tree map for visually displaying on a display device selected consolidated order fulfillment data. The tree map includes a plurality of configurable and selectable parameters for allowing a user to select parameters associated with the customer orders, and wherein the selectable parameters include one or more of: a selected warehouse, the maximum number of items per bulk pick ticket, the minimum shipment count per bulk pick recipe, or the maximum number of recipes per bulk pick.

According to still another practice, the present invention is directed to a computer-implemented method comprising collecting information associated with a plurality of customer orders from a plurality of customers and generating customer order data that includes data associated with each of the plurality of customer orders and the plurality of customers, wherein each of the plurality of customer order includes one or more items associated therewith; grouping together similar ones of the items associated with the plurality of customer orders to form a plurality of bulk picks, wherein one or more of the plurality of bulk picks can form part of one or more bulk pick tours, and wherein the one or more bulk picks includes one or more bulk pick recipes, wherein each of the bulk pick recipes includes a selected quantity of one or more items from the customer orders and a selected quantity of one or more additional items; and generating a bulk pick ticket associated with each of the bulk picks.

BRIEF DESCRIPTION OF DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Exemplary embodiments of the present invention address these and other problems associated with the picking of items corresponding to a customer order by employing an order fulfillment system for picking the items and then packaging and shipping the items to the customer.

The present invention is directed to a time based customer ordering and customer order consolidation system suitable for use in an automated or partially automated order fulfillment environment. The customer order can include one or more items that the customer has selected or purchased, and can if desired include additional items, such as warranty information, sales or promotional literature and related brochures, item instructions and the like.

Figure 1:
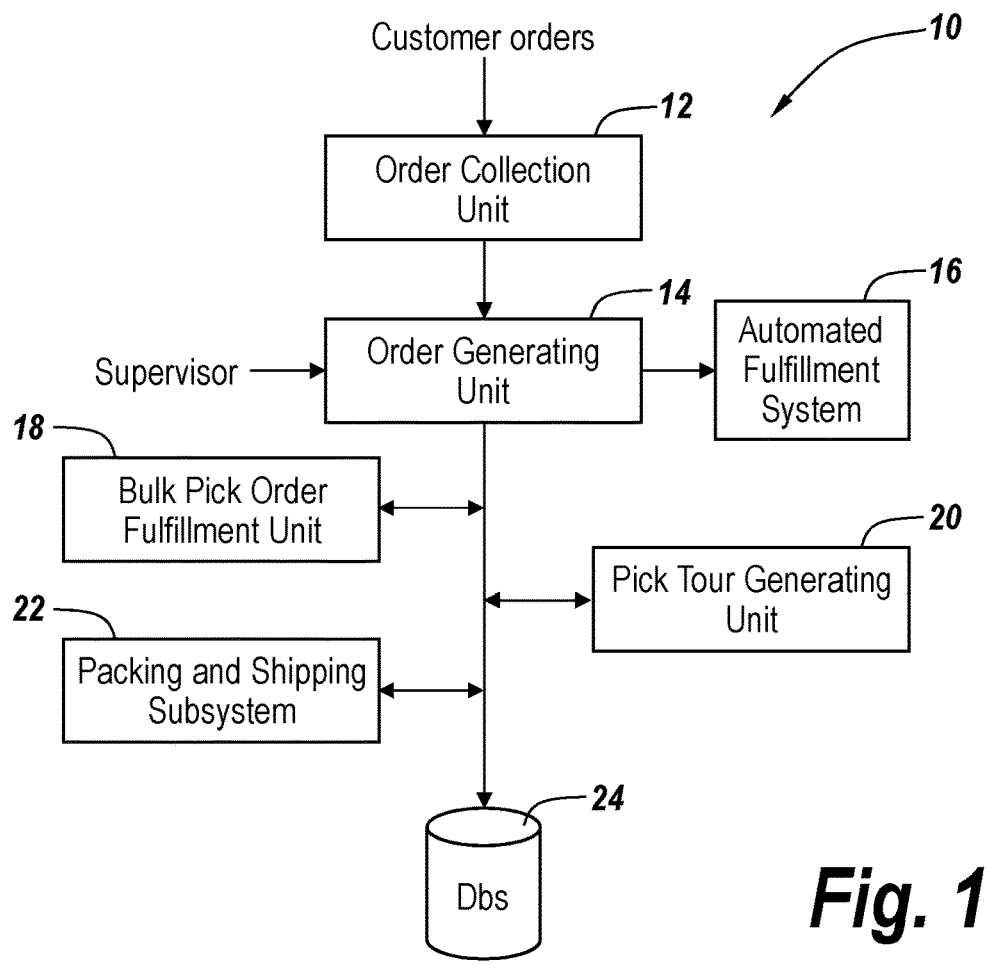
FIG. 1 is a schematic block diagram of the order fulfillment system of the present invention.

As shown in FIG. 1, the order fulfillment system 10 of the present invention includes an order collation or collection unit 12 for collecting or collating customer orders as they are entered into the system. As is known in the art, the customer orders can be introduced or entered into the system either through the Internet via a website ordering operation or can be entered into the system by a customer service representative while accepting order instructions directly from the customer, such as over a telephone. The customer order collection unit 12 can generate customer and order information or data that is transmitted and received by an order generating unit 14. The order collection unit 12 consolidates the incoming customer orders and organizes and consolidates selected order and customer information from the customer orders, including for example the customer ID, the shipment address, type of shipment, number of items in the customer order, and the like. The order generating unit 14 is configured for controlling and managing the order data for fulfillment at a fulfillment facility or warehouse in a time based manner. The order data is preferably organized and managed by the order generating unit 14 so as to optimize the selection (e.g., picking) of the items in the customer order and then shipping the items to the customer in an expeditious manner.

The order generating unit 14 can be monitored by a separate computing system and/or a warehouse supervisor via the computing system to determine the order fulfillment actions that need to be taken. The order generating unit 14 is adapted or configured to prepare a set of order fulfillment instructions or data for fulfilling the incoming customer orders in a time based manner. The fulfillment order instructions can be based on a set of logical rules and ordering priorities for releasing one or more customer orders to be fulfilled by the order fulfillment system 10.

The consolidated order fulfillment instructions or data generated by the order generating unit 14 can be transmitted to an automated fulfillment system 16, such as an automated product picking system. An example of a suitable automated product picking system suitable for use with the present invention includes the systems manufactured and sold by SSI Schaefer, Germany. As is known in the art, the automated fulfillment system 16 can include a series of vertical towers or stacks that include a number of distinct receptacles for storing one or more items. The stacks can be stationary or adapted to rotate about a central longitudinal axis. The stacks can be coupled to one or more movable retrieval arms or mechanisms that are adapted to move vertically along the stacks and if desired between the stacks. The items or products retrieved by the movable arms can be placed in one or more totes or bins, which in turn can be moved or conveyed along a conveyance system. The conveyance system can include tracks with rollers and the like. The automated fulfillment system 16 can be controlled or operated by a central or a dedicated computing system.

Alternatively, the order generating unit 14 can transmit the order fulfillment instructions to a bulk pick order fulfillment unit 18. For example, according to one practice, the order generating unit 14 can be configured to group together a set of customer orders that share similar features, items or traits, into a larger bulk pick order, and the bulk pick order data can be transmitted to the bulk pick order fulfillment unit 18. Alternatively, the bulk pick order fulfillment unit 18 can generate the bulk pick data. The bulk pick orders (e.g., a bulk pick order wave) are groupings of customer orders that may be picked or fulfilled in a warehouse in aggregate as opposed to fulfilling each customer order independently. As such, warehouse data that includes the configuration of the warehouse, which can include rows of storage racks with associated storage bins, and data associated with specific items located in specific bins at specific warehouse locations, can be stored in the database 24 and is accessible by the order generating unit 14, the bulk pick order fulfillment unit 18 and the pick tour generating unit. The bulk pick orders forming the bulk pick wave are selected so as to optimize the fulfillment process by selecting orders that have certain features, items or traits in common. The bulk pick order fulfillment unit 18 can generate data associated with a bulk pick that can form part of a bulk pick tour or wave, and which can be fulfilled by the automated product picking system 16, by one or more mobile operators or pick agents that manual pick one or more items corresponding to the bulk pick tour, or by both. As used herein, the term "bulk pick," "bulk pick tour," or "bulk pick wave," is intended to mean a plurality of similar or identical items that are grouped or bulked together and which can be selected based on the warehouse data from a selected warehouse location. The bulk picks or grouped items when assigned to the automated fulfillment system or to a pick tour agent for retrieval form the bulk pick tours. The bulk picks or bulk pick tours can then be assigned to the pick agents or to the automated fulfillment unit in series to form a bulk pick wave.

Additionally or alternatively, the order generating unit 14 can interface with a pick tour generating unit 20, which receives the order fulfillment instructions from the order generating unit 14. The pick tour generating unit 20 can generate pick tour instructions for a single item or a multi-item order. The pick tour instructions can be forwarded to the automated product picking system and/or to a pick tour mobile operator for performing a pick tour. The pick tour generating unit 20 generates pick tour instructions based on the consolidated customer order information received from the order generating unit 14. The pick tour instructions leverage the similarity in customer orders and item locations within the warehouse so as to minimize the amount of time it takes to pick the one or more items that comprise the customer order. The pick tour instructions can generate or be converted into a pick tour that can be assigned to pick agents or mobile operators. The pick agents can utilize a mobile cart that has selected compartments associated therewith to manually pick or select the items that correspond to the customer order from the warehouse. The pick agent can employ a handheld scanning device, such as for example the conventional handheld scanners sold by Intermec, that can guide the pick agent to the selected location of the item and assist the pick agent in selecting the correct item. The handheld device also serves to allow the order fulfillment system 10 to track and verify the location of the pick agent, and to perform product and location verification in real time. As used herein, the term "pick tour" is intended to mean a series of instruction that include one or more pick tasks that when aggregated or consolidated together form a tour. The tour is in essence a series of instructions sent to the pick agent to pick, select or retrieve one or more items associated with one or more customer orders from selected locations within the warehouse. Alternatively, the pick tour can be performed by the automated fulfillment system 16, which receives the aggregated list of items (or tour) from the pick tour generating unit and retrieves the items from selected locations within the automated fulfillment system.

Once the customer order has been picked and fully assembled, the contents of the order can be assembled into totes or compartments of totes, which are then placed on a conveyor belt and sent to a packing and shipping subsystem 22. A packaging and shipping subsystem suitable for use with the present invention includes the packing station disclosed in U.S. Publ. No. 2014/0360141, to the assignee hereof, the contents of which are herein incorporated by reference. In transit, the order fulfillment system 10 can also include structure for automatically printing a customer invoice and/or packing slips for insertion within the corresponding compartment within the tote. The illustrated packing and shipping subsystem 22 receives the totes and packages the contents of each compartment of the tote for shipping to the customer.

As shown, the illustrated order fulfillment system 10 can also include a general database 24 for storing information concerning the customer orders as well as selected information corresponding to each of the illustrated units and subsystems. Specifically, the database 24 can store customer information, including customer name, address, financial payment details, order history and the like. The database 24 can also store information regarding the items that are stored in the warehouse as well as the warehouse information. The item information can include details of each item, including item type, description, price, quantity and the like. The database can also be configured to store information regarding the programs and associated segments or plays that are broadcast, as well as the sequence of items that are displayed and discussed during the program.

The order generating unit 14 of the present invention is configured to collect data associated with the customer orders and prepare a set of order fulfillment instructions for fulfilling the incoming customer orders in a time based manner. The order fulfillment instructions can be based on a set of logical rules and ordering priorities for releasing one or more customer orders to be fulfilled by the order fulfillment system 10. The order generating unit 14, based on the number of customer orders, and the overlap or similarity between the items in the orders, can send instructions to the bulk pick order fulfillment unit 18 to execute a bulk pick of selected items. The order generating unit 14 or the bulk pick order fulfillment unit 18 can schedule the bulk pick at a time of day that is convenient based on the total number of customer orders being handled, the time of day, the number of pick agents assigned to the warehouse floor, and the like.

Figure 7:
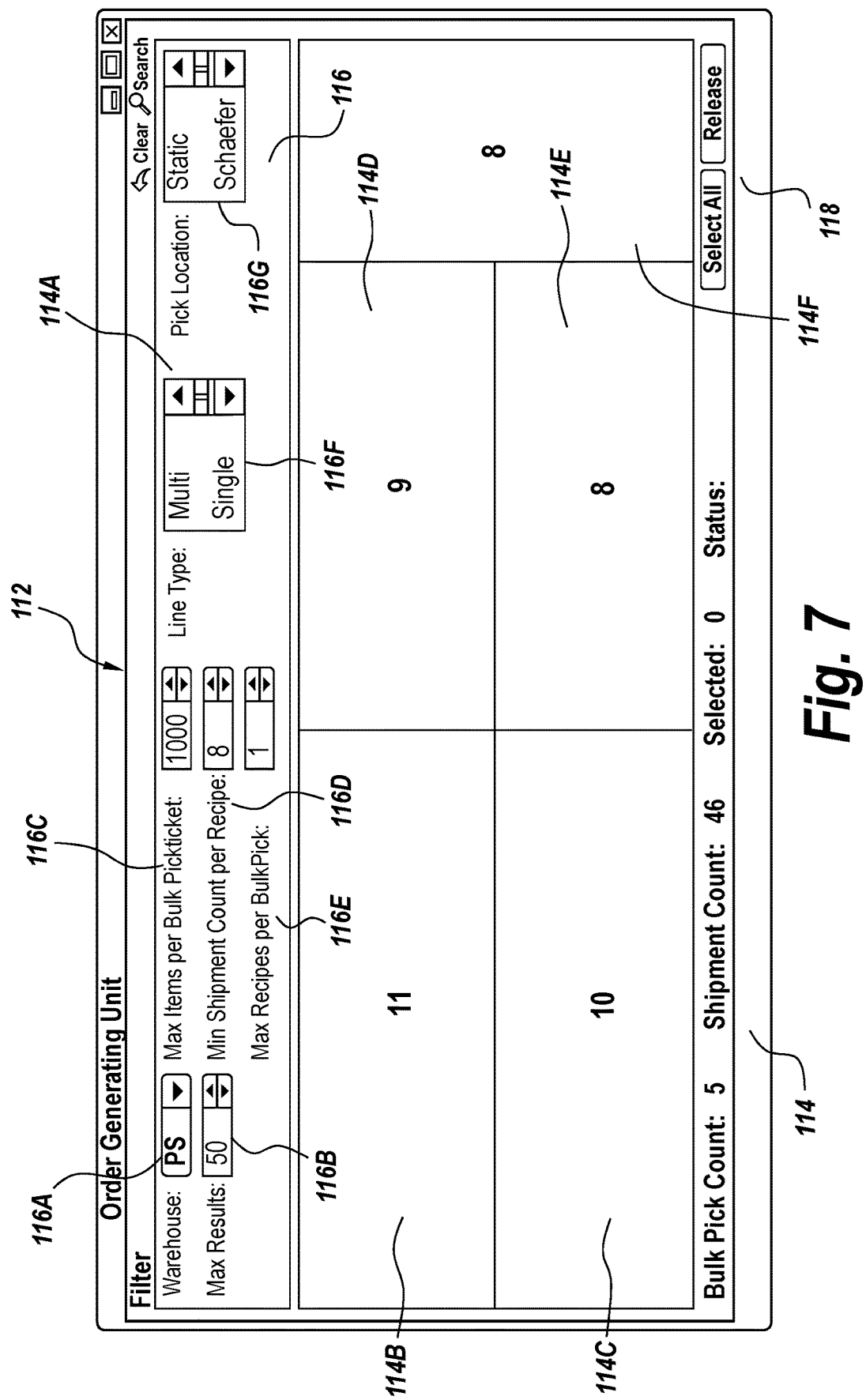
FIG. 7 is a tree map that operates as a visual representation of the relative amount of work that can potentially be fulfilled via a bulk pick order via a set of configurable operating parameters according to the teachings of the present invention.

The order generating unit 14 can generate a color coded or non-color coded tree map that can be displayed to the supervisors on a suitable display device as a visual representation of the relative amount of work that can potentially be fulfilled via a bulk pick order by the bulk pick order fulfillment unit 18 under a set of configurable operating parameters. An example of such a tree map is shown in FIG. 7. As shown, the order fulfilment system 10 can generate content that is displayed on a window or interface on a display device. The illustrated window 112 can include one or more panes 114 to display selected content associated with the customer orders and to enable or allow a user to customize via selectable parameters the metric associated with a bulk pick or wave. The panes 114 can include pane 114A that is positioned in an upper portion or region of the window 112 and which displays a set of user selectable parameters 116. The parameters 116 can include the selected warehouse 116A, the maximum number of results 116B to be considered by the bulk pick order fulfillment unit 18, the maximum and minimum number of different multi-item combinations (e.g., recipes) 116C to generate per bulk pick, the maximum recipes per bulk pick 116E, the line type 116F which includes whether a single item, mult-item, or both single item and multi-item orders should be included in the tree map and the pick location 116G (e.g., static (non-automated) or automated fulfillment system). The order generating unit 14 can then generate a map of the bulk wave for visual display to the user. The flexibility of these parameters enables the supervisor to adapt the amount and types of work they have pending in the order collection unit 12 to the available pick agents and availability of other system equipment, including the automated fulfillment system 16. The foregoing features or parameters can be presented to the supervisor in any suitable format, and can preferably be displayed in a dashboard format via the pane elements 114. The order generating unit 14 can release order information to the bulk pick order fulfillment unit 18 to generate bulk picks and to the pick tour generating unit 20 to generate mobile pick tours for the pick agents. The order generating unit 14 via the window 112 can display the map that can be illustrated as a set of pane elements 114A-114F. Each of the respective panel elements 114A-114F contains the total number of customer orders that are included in the bulk pick. Larger numbers are contained in larger rectangles in the tree map and are ordered such that the larger total order counts are placed in a top-to-bottom left-to-right ordered by size. In addition to the size of the rectangle indicating the relative number of orders, the color of the rectangle may be used as a visual indicator of the estimated size or effort (e.g., red indicating a large number of orders, and blue representing a lower number of orders). This coloring technique offers a visual heat map of the orders that can be generated into bulk picks allowing a user to rapidly visually inspect the number of orders and estimate the effort involved to fulfill the respective bulk picks when released. The window 112 also displays on a bottom portion thereof parameter values selected by the user, including the bulk pick count, shipment count, as well as action buttons 118 that allow the user to select the illustrated parameters or to release the bulk wave to the system 10. As used herein, a pane element can be a user interface or portion thereof, such as a screen, a space, a surface, or the like.

The bulk pick order fulfillment unit 18 employs processing hardware for implementing heuristics and rule based schedules that determine the optimal way to group items in the customer orders into shipments. The logical parameters include consideration of the payment status of the customer or of the customer orders, destination addresses, and services such as sizing and appraisals that may have been applied to the items of the customer order. The bulk pick order fulfillment unit 18 also considers the shipping option selected by the customer and the guaranteed or estimated shipping dates that were communicated to the customer, as well as other factors, including grouping of items based on specific product brand, sales of items, and different sales channels.

Consolidating customer orders into shipments using the foregoing time-based process has multiple benefits and advantages. One advantage is that the process reduces the amount of shipment packaging materials needed, reduces the number of promotional inserts needed, and reduces the overall postage cost of shipping the packages. Additionally, customers may be incentivized to purchase additional items by reduced shipping and handling rates for additional items purchased within a selected time period, such as for example a twenty four hour time period.

Figure 2:
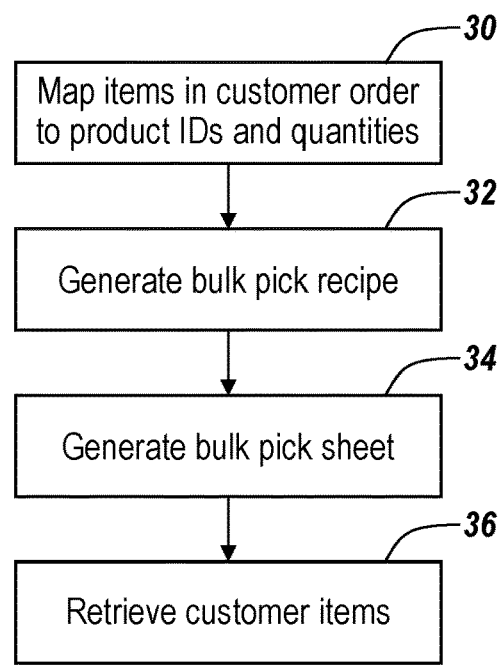
FIG. 2 is a schematic flowchart diagram illustrating the steps for generating a bulk pick recipe according to the teachings of the present invention.
Figure 3:
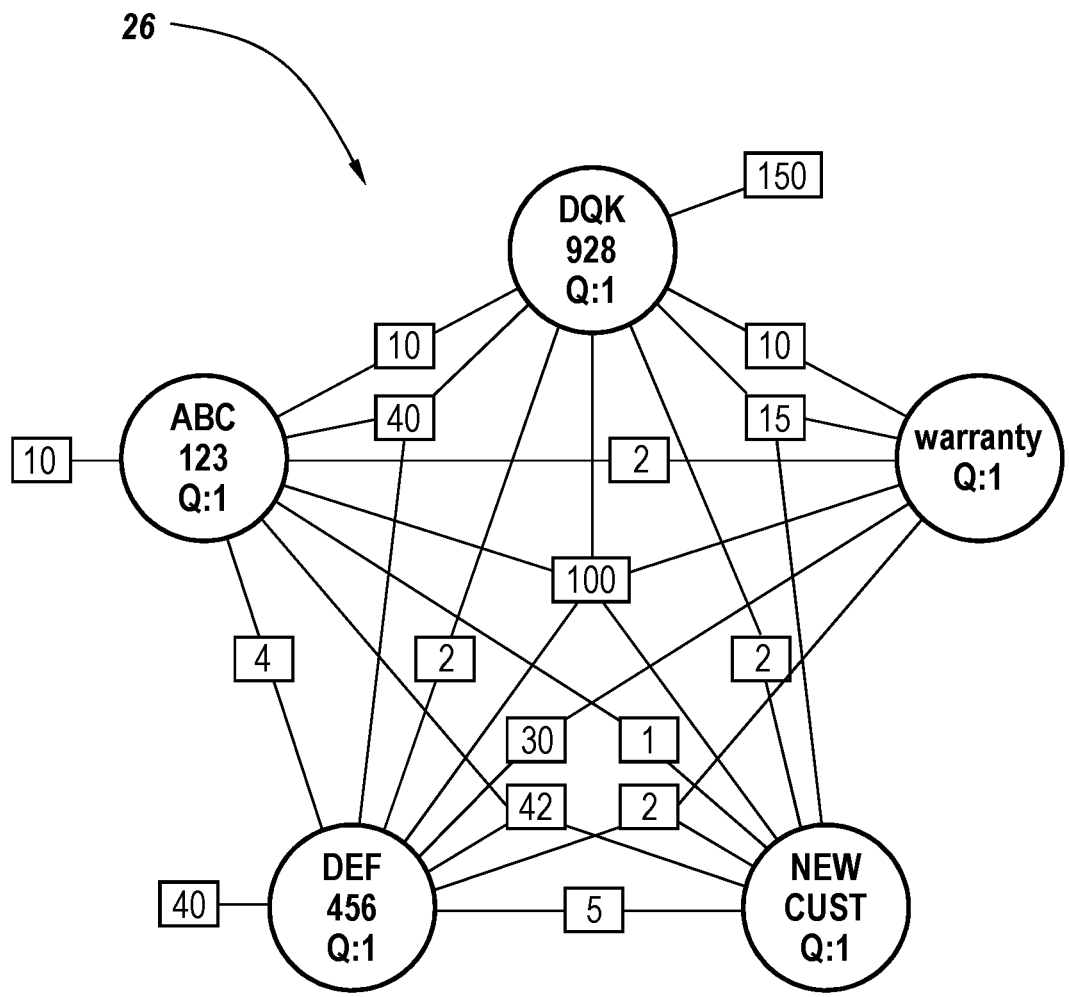
FIG. 3 is a connected tree map diagram for determining the relationship between various items in various customer orders according to the teachings of the present invention.

FIG. 2 is a schematic flow chart diagram that illustrates the process or method that the bulk pick order fulfillment unit 18 employs to generate one or more bulk picks or bulk pick recipes from the consolidated order fulfillment data received from the order generating unit 14. The bulk pick order fulfillment unit 18 includes processing hardware, such as a processor or a controller, that is configured to initially map items in the customer order to product identification (ID) data and selected quantities of product, step 30. For example, as shown in FIG. 3, the illustrated bulk pick order fulfillment unit 18 generates a connected graph 26 of groupings of customer orders and corresponding items, and then devolves the customer orders into constituent items and corresponding inserts such as informational, warranty, and marketing materials, and places them on the connected graph as nodes. As shown, and according to a simple example, the items that form part of this potential bulk group of customer orders include three different product items designated as ABC123, DEF456, and DQK928 that were purchased by customers and formed part of the customer order data. In addition to the customer items, the example assumes that the orders also include a new customer card designated as NEW CUST and a warranty card. The number of purchased items that overlap and require warranty and new customer cards are illustrated by the connecting lines with corresponding amounts or numbers. Specifically, the number of customers that purchased selected items and require a warranty or new customer card are shown in the intermediate number boxes. As shown, one hundred (100) customers purchased all three items and require a warranty card and a new customer card; one hundred fifty (150) customers only purchased the item DQK928; only forty (40) customers purchased item DEF456; forty (40) customers purchased all three items and are not receiving any inserts, and so forth. Other item amounts are also shown.

Figure 4:
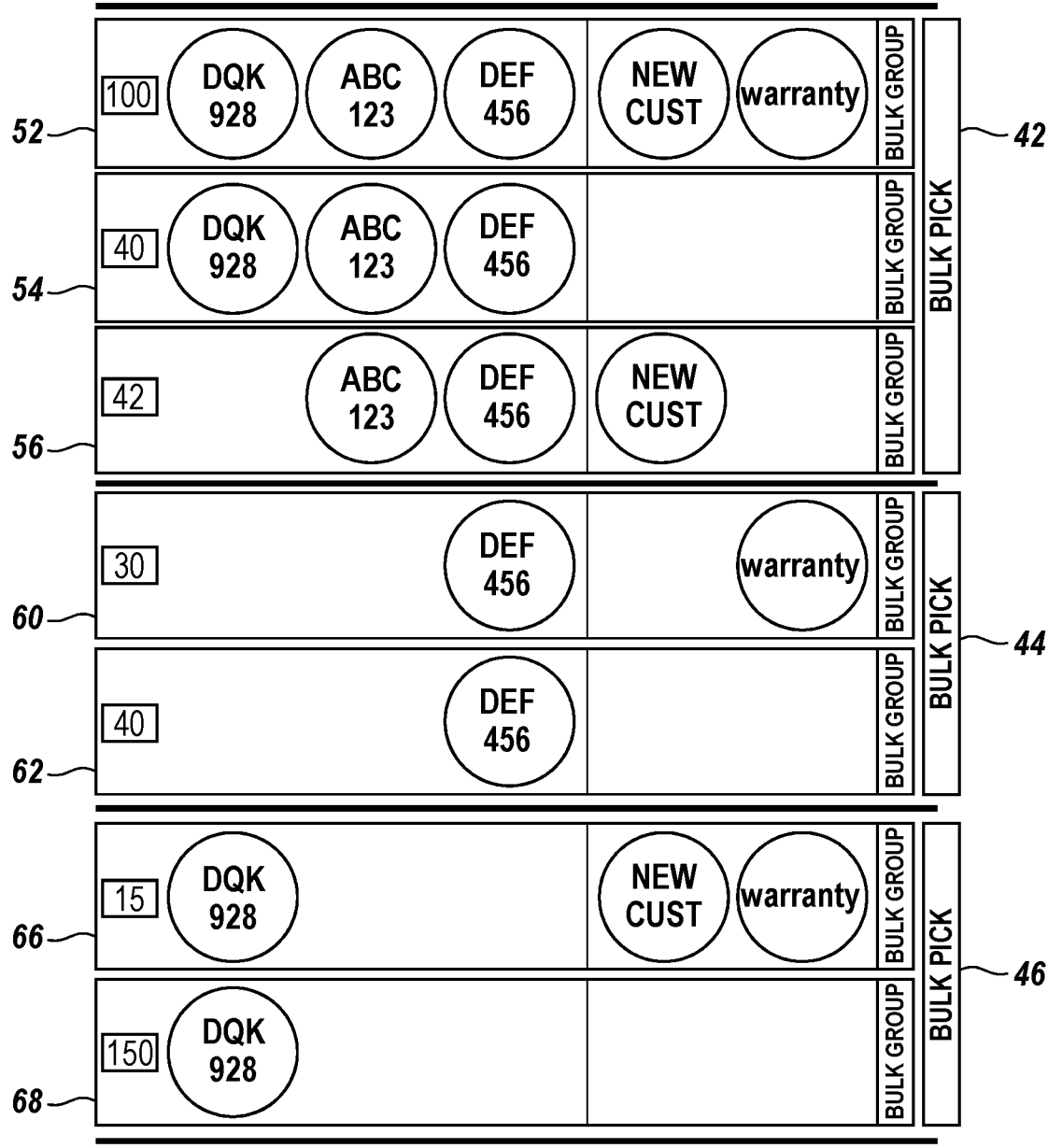
FIG. 4 is a depiction of the bulk picks and corresponding bulk pick recipes according to the teachings of the present invention.

The bulk pick order fulfillment unit 18 can also generate one or more bulk pick recipes from the data associated with the connected graph, step 32. As used herein, the term "recipe" or "bulk pick recipe" is intended to mean a collection of a selected items from the customer orders and the additional items that are correlated or grouped together. As shown in FIG. 4, a user such as the supervisor can select various parameters or features 58 of the bulk pick in the bulk pick order fulfillment unit 18. For example, a user or the system 10 can define the maximum number of recipes per bulk pick, the maximum item count per bulk pick, and the minimum bulk group item count. Once the user has selected these parameters, the resulting calculated values for the bulk pick are presented including the total number of ingredients (i.e. items), the total number of recipes, and the total number of bulk picks that are generated. As shown, the bulk pick order fulfillment unit 18 generates and constructs bulk picks 42, 44, and 46, where each bulk pick comprises a selected number of bulk pick recipes or bulk groups. The bulk pick order fulfillment unit 18 can determine the bulk pick group or recipe sequence by determining the largest or smallest matching product or item count and then determining the largest or smallest number of inserts. The system can thus organize and aggregate the data in ascending or descending order relative to the number of items in the bulk pick. Those of ordinary skill in the art will readily recognize that the item data from the connected graph 26 can be organized in other ways as well. As illustrated, bulk pick 42 includes bulk pick recipes 52, 54 and 56; bulk pick 44 includes recipes 60 and 62; and bulk pick 46 includes recipes 66 and 68. Each of the above recipes includes one or more ingredients or items. For example, recipe 52 includes five ingredients, including items DQK928, ABC123, and DEF456, as well as the new customer insert NEW CUST and the warranty insert. Recipe 54 includes items DQK928, ABC123, and DEF456 with no additional inserts, and recipe 56 includes, for ingredients, items ABC123 and DEF456 and the new customer insert NEW CUST. Once the maximum number of recipes for each of the bulk picks is reached, the bulk pick order fulfillment unit 18 creates a further bulk pick. The bulk pick order fulfillment unit 18 can also generate less than the maximum number of bulk pick recipes, such as those associated with the bulk picks 44 and 46. The bulk pick order fulfillment unit 18 generates and organizes the bulk picks so that the most difficult recipes are collated first into the first bulk pick. For example, as shown in FIG. 4, the bulk pick 42 includes recipes 52, 54, 56 that are more complicated than the recipes in the other bulk picks 44 and 46.

When the bulk pick order fulfillment unit 18 generates one or more bulk pick recipes that include ingredients (or the recipe itself) outside of one or more of the predetermined parameters, the unit 18 does not generate a bulk pick employing these recipes. The bulk picks and corresponding bulk pick recipes can be utilized by the system 10, such as by the pick tour generating unit 20 or the automated fulfillment system 16 so that the ingredients within the recipe are selected either by pick agents via a mobile tour or by the automated system. Further, the bulk pick order fulfillment unit 18 partitions or separates the bulk picks from each other according to the bulk pick group count parameter and the maximum item count per bulk pick parameter.

Figure 5:
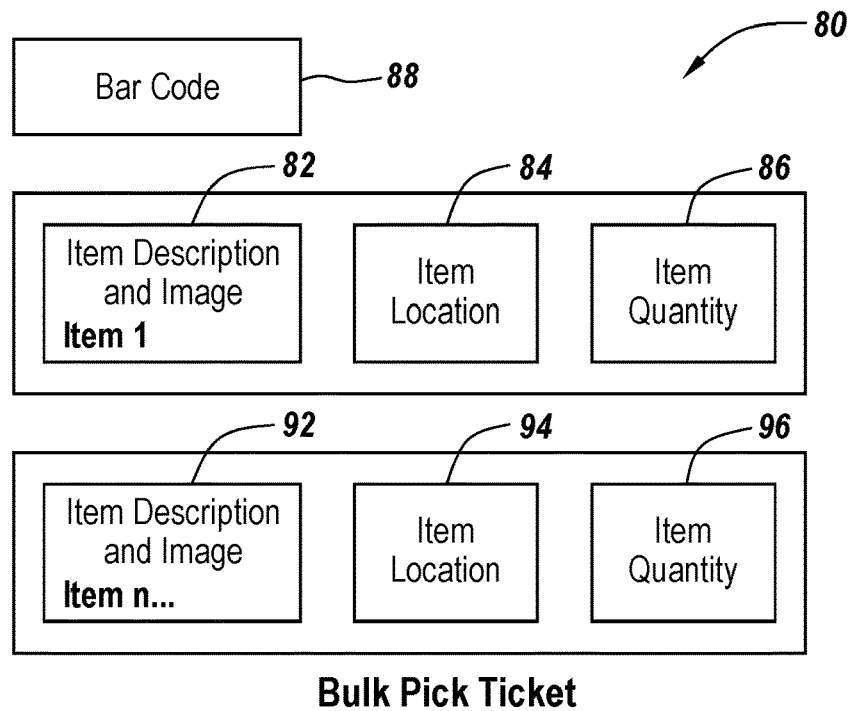
FIG. 5 is a schematic block diagram of a bulk pick ticket generated by the order fulfillment system of the present invention.

The bulk pick order fulfillment unit 18 then generates a bulk pick sheet or ticket that corresponds to each of the bulk picks 42, 44, 46, step 34. The bulk pick ticket is sent to either a mobile pick agent and/or to the automated fulfillment system 16 to retrieve the items, step 36. If the bulk pick ticket is sent to the automated system 16, processing hardware and corresponding software associated with the system 10 or the automated system 16 can perform the retrieval of the items based on the information contained within the bulk pick ticket. FIG. 5 is an example of a bulk pick ticket 80 generated by the bulk pick order fulfillment unit 18 according to the teachings of the present invention. The bulk pick ticket 80 can be printed by any suitable printing device associated with or coupled to the bulk pick order fulfillment unit 18 or the bulk pick ticket can be transmitted to other portions of the system 10 via processing hardware. The illustrated bulk pick ticket 80 can include any selected type and arrangement of information, and includes for example a description and image of one or more items, such as the illustrated Item 1 and Item n. The first listed item in the bulk pick ticket 80 is Item 1, and includes information such as the description and image of the item 82 to be picked from the warehouse, one or more locations of the item 84 in the warehouse, as well as the quantity of the item 86 to be picked. Similarly, Item n includes information such as the description and image of the item 92 to be picked from the warehouse, a location of the item 94 in the warehouse, as well as the quantity of the item 96 to be picked. The bulk pick order fulfillment unit 18 can print one or more of the bulk pick tickets 80 for use by the system and by, for example, a pick agent. A bar code 88 can also be associated with the bulk pick ticket 80 so that the pick agent and subsequent handlers of the items can determine the customer orders associated with the items.

The items identified by the bulk pick process of the bulk pick order fulfillment unit 18 and as set forth in the bulk pick ticket 80 can be picked according to the following process. One of ordinary skill in the art will readily recognize that the process can include additional steps or can omit one or more of the following steps without departing from the spirit and scope of the present invention.

Figure 6:
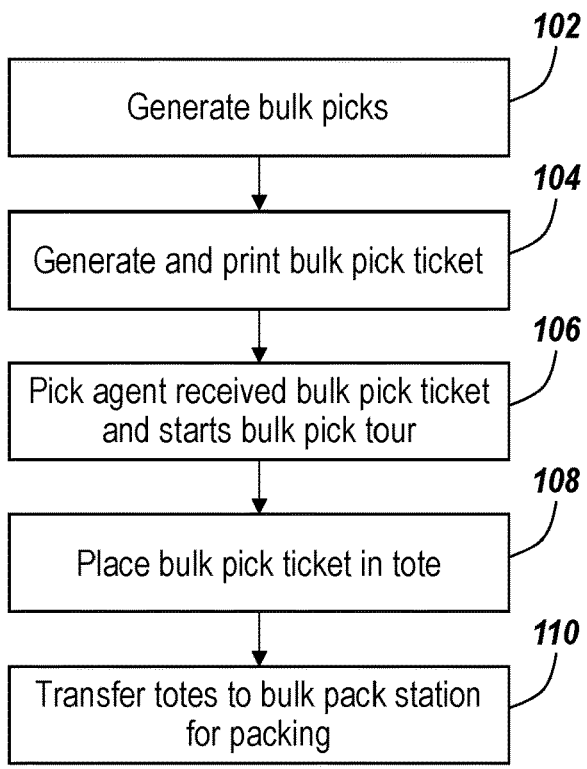
FIG. 6 is a schematic flow chart diagram illustrating the steps involved with generating a bulk pick ticket and associated bulk pick tour according to the teachings of the present invention.

As shown in FIG. 6, the order fulfillment system 10 of the present invention collates and collects the customer order information with the order collection unit 12, and conveys this information to the order generating unit 14. The order generating unit 14 visually displays the order data through a display device to a warehouse supervisor, who sets or selects certain bulk wave parameters. For example, the system 10 can generate the tree map shown in FIG. 7 for use by the supervisor. The order generating unit 14 also receives other related information, such as additional customer information, order status information, and other system related information, from the database 24. The order generating unit 14 then transmits consolidated order fulfillment information to the bulk order fulfillment unit 18. The bulk order fulfillment unit 18 generates the bulk picks, step 102. The bulk pick and related customer order and item information is sent to a print device to print the bulk pick ticket 80, step 104. The bulk pick ticket 80 is received by a pick agent in the warehouse who creates or employs a bulk pick cart for temporarily storing the items associated with the bulk pick. The pick agent then starts a bulk pick tour, step 106. The pick agent moves along a path in the warehouse that is optionally optimized by the system 10 to retrieve or pick the items at selected locations. The selected items are then placed in selected compartments within each tote that is stored on the cart, or kept separated in containers or bags. The bulk pick ticket is then associated with one or more of the totes, step 108. Specifically, the bulk pick ticket can be placed on one of the totes, typically the tote on top when stacked, or is affixed to the cart in cases of very large bulk picks. The cart and associated totes are then moved to a selected area in the warehouse, and the totes are moved from the cart to a temporary holding station, and are then transferred by any suitable mechanism, including a conveyor belt system, to a bulk packing station, step 110. A bulk pack agent associated with the bulk pack station then scans the bulk pick ticket 80 to determine if the recipes of the bulk pick are complete. If not, then the agent keeps assembling customer orders according to the bulk pick recipe until the recipe is complete. If more than one recipe is included in the bulk pick, then the next unfinished recipe is loaded for continued processing. The items are then packed and shipped to the customer according to known techniques.

The bulk picking of items in customer orders by the bulk pick order fulfillment unit 18 offers additional benefits and advantages. For example, a bulk pick is more efficient than a shipment pick performed by pick agents in situations where there are many customers that ordered the same set of items. This is because the pick agent only needs to visit a location once per item, and can pick multiple ones of the same item at the same time. Although the pick agent can employ a mobile cart for picking multiple single item shipments, or multiple multi-item shipments on a cart while performing non-bulk picks, a barcode scan is required on each item and tote compartment to perform an association to ensure item movement tracking accuracy. The bulk pick process can handle much larger quantities or items per pick, and does not require a barcode scan.

By way of example, consider a situation where one hundred customers ordered the same item. A pick agent can be directed to pick one hundred of the same item from a stock location and then take the entire group to a bulk processing station where the weight of the item and inserts is acquired once, customer invoices are printed, and then the agent assembles the individual shipments like stuffing envelopes. In addition to single item bulk picks, the system 10 supports multi-item picks and also takes into account any promotional, product oriented, or customer oriented inserts such that each of the recipes is unique. An example of a multi-item bulk is an ensemble scenario where one hundred customers ordered a ring, and fifty of those customers also ordered the matching bracelet, and another twenty five customers ordered just the bracelet. This would yield a bulk pick with two items: one hundred rings, and seventy five bracelets. This example bulk pick is then assembled into separate customer orders from a total of three recipes: fifty of just the ring, fifty of the ring and bracelet, and twenty-five of just the bracelet. In addition, customer oriented inserts yield more variations of these recipes, but ultimately there is a single pick of just two items that was able to fulfill all of these permutations.

The ability to pick single item shipments and multi-line shipments in parallel via bulk pick reduces the amount of distance and time that it takes to pick the customer shipments. An additional benefit of using the bulk pick process and system is being able to utilize less sophisticated machinery to perform the final packaging step of processing the shipment.

Exemplary Hardware

Following below and referenced above are more detailed descriptions of various concepts and associated hardware of the units of the order fulfillment system 10 of the present invention. It should be appreciated that various concepts introduced above and discussed in greater detail below may be implemented in any number of ways, as the disclosed concepts are not limited to any particular manner of implementation. Examples of specific implementations and applications are provided below primarily for illustrative purposes and for providing or describing the operating environment of the order fulfillment system of the present invention.

Figure 8:
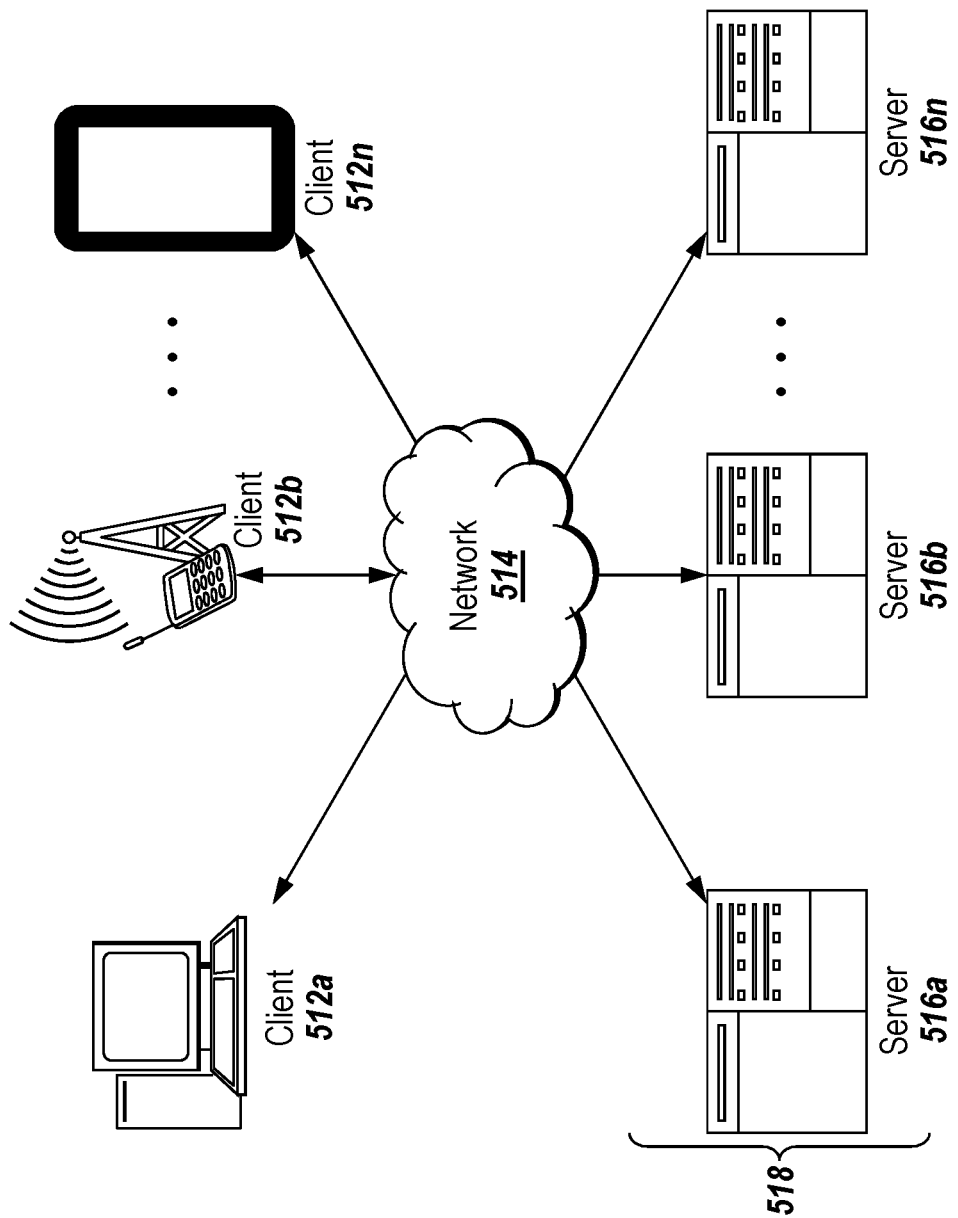
FIG. 8 is a schematic block diagram depicting an embodiment of a network environment comprising client devices in communication with servers through a network arrangement.

Consistent with the foregoing inventive embodiments, it is helpful to describe aspects of the operating environment as well as associated system components (e.g., hardware elements) in connection with the methods and systems described herein. For example, the order fulfillment system 10 of the present invention and associated sub-systems and units, including for example the order collection unit 12, the order generating unit 14, the automated fulfillment system 16, the bulk pick order fulfillment unit 18, the packing and shipping sub-system 22, the pick tour generating unit 20, the database 24, and any other hardware devices including hand-held scanners and printers, can be coupled together in a network environment. Further, any system unit or combination of units can be consolidated on a single hardware device. For example, as shown in FIG. 8, a typical network environment can include hardware devices such as one or more clients 512a-512n (also generally referred to as local machine(s) 512, client(s) 512, client node(s) 512, client machine(s) 512, client computer(s) 512, client device(s) 512, endpoint(s) 512, or endpoint node(s) 512) in communication with one or more servers 516a-516n (also generally referred to as server(s) 516, node 516, or remote machine(s) 516) and databases via one or more networks 514. In some embodiments, a client 512 has the capacity to function as both a client node seeking access to resources provided by a server and as a server providing access to hosted resources for other clients 512a-512n. The clients can be any suitable electronic or computing device, including for example, a computer, a server, a smartphone, a smart electronic pad, a portable computer, and the like, such as the computing device 600. The various units 12, 14, 18, 20 and database 24 of the order fulfillment system 10 of the present invention can be implemented as a client device 512 and/or a server 516. The sub-systems 16 and 22 of the system 10 can communicate with the remainder of the system 10 via the network 514. Although FIG. 8 shows a network 514 between the clients 512 and the servers 516, the clients 512 and the servers 516 may be on the same network 514. In some embodiments, there are multiple networks 514 between the clients 512 and the servers 516. In one of these embodiments, a network 514' (not shown) may be a private network and a network 514 may be a public network. In another of these embodiments, a network 514 may be a private network and a network 514' a public network. In still another of these embodiments, networks 514 and 514' may both be private networks.

The network 514 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 514 may be any type and/or form of network. The geographical scope of the network 514 may vary widely and the network 514 can be a body area network (BAN), a personal area network (PAN), a local-area network (LAN), e.g. Intranet, a metropolitan area network (MAN), a wide area network (WAN), or the Internet. The topology of the network 514 may be of any form and may include, e.g., any of the following: point-to-point, bus, star, ring, mesh, or tree. The network 514 may be an overlay network, which is virtual and sits on top of one or more layers of other networks 514'. The network 514 may be of any such network topology as known to those ordinarily skilled in the art capable of supporting the operations described herein. The network 514 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 514 may be a type of a broadcast network, a telecommunications network, a data communication network, or a computer network.

In some embodiments, the network system may include multiple, logically-grouped servers 516. In one of these embodiments, the logical group of servers may be referred to as a server farm 518 or a machine farm 518. In another of these embodiments, the servers 516 may be geographically dispersed. In other embodiments, a machine farm 518 may be administered as a single entity. In still other embodiments, the machine farm 518 includes a plurality of machine farms 518. The servers 516 within each machine farm 518 can be heterogeneous, and one or more of the servers 516 or machines 516 can operate according to one type of operating system platform (e.g., WINDOWS NT, manufactured by Microsoft Corp. of Redmond, Wash.), while one or more of the other servers 516 can operate according to another type of operating system platform (e.g., Unix, Linux, or Mac OS X).

In one embodiment, servers 516 in the machine farm 518 may be stored in high-density rack systems, along with associated storage systems, and located in an enterprise data center. In this embodiment, consolidating the servers 516 in this way may improve system manageability, data security, the physical security of the system, and system performance by locating servers 516 and high performance storage systems on localized high performance networks. Centralizing the servers 516 and storage systems and coupling them with advanced system management tools allows more efficient use of server resources.

The servers 516 of each machine farm 518 do not need to be physically proximate to another server 516 in the same machine farm 518. Thus, the group of servers 516 logically grouped as a machine farm 518 may be interconnected using a wide-area network (WAN) connection or a metropolitan-area network (MAN) connection. For example, a machine farm 518 may include servers 516 physically located in different continents or different regions of a continent, country, state, city, campus, or room. Data transmission speeds between servers 516 in the machine farm 518 can be increased if the servers 516 are connected using a local-area network (LAN) connection or some form of direct connection. Additionally, a heterogeneous machine farm 518 may include one or more servers 516 operating according to a type of operating system, while one or more other servers 516 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 518 may be de-centralized. For example, one or more servers 516 may comprise components, subsystems and modules to support one or more management services for the machine farm 518. In one of these embodiments, one or more servers 516 provide functionality for management of dynamic data, including techniques for handling failover, data replication, and increasing the robustness of the machine farm 518. Each server 516 may communicate with a persistent store and, in some embodiments, with a dynamic store.

Server 516 may be a file server, application server, web server, proxy server, appliance, network appliance, gateway, gateway server, virtualization server, deployment server, SSL VPN server, or firewall, or any other suitable computing device, such as computing device 600. In one embodiment, the server 516 may be referred to as a remote machine or a node. In another embodiment, a plurality of nodes may be in the path between any two communicating servers. The units 12, 14, 18 and 20 of the order fulfillment system 10, FIG. 1, of the present invention can be stored or implemented on one or more of the servers 516 or clients 512, and the hardware associated with the server or client, such as the processor or CPU and memory.

Figure 9:
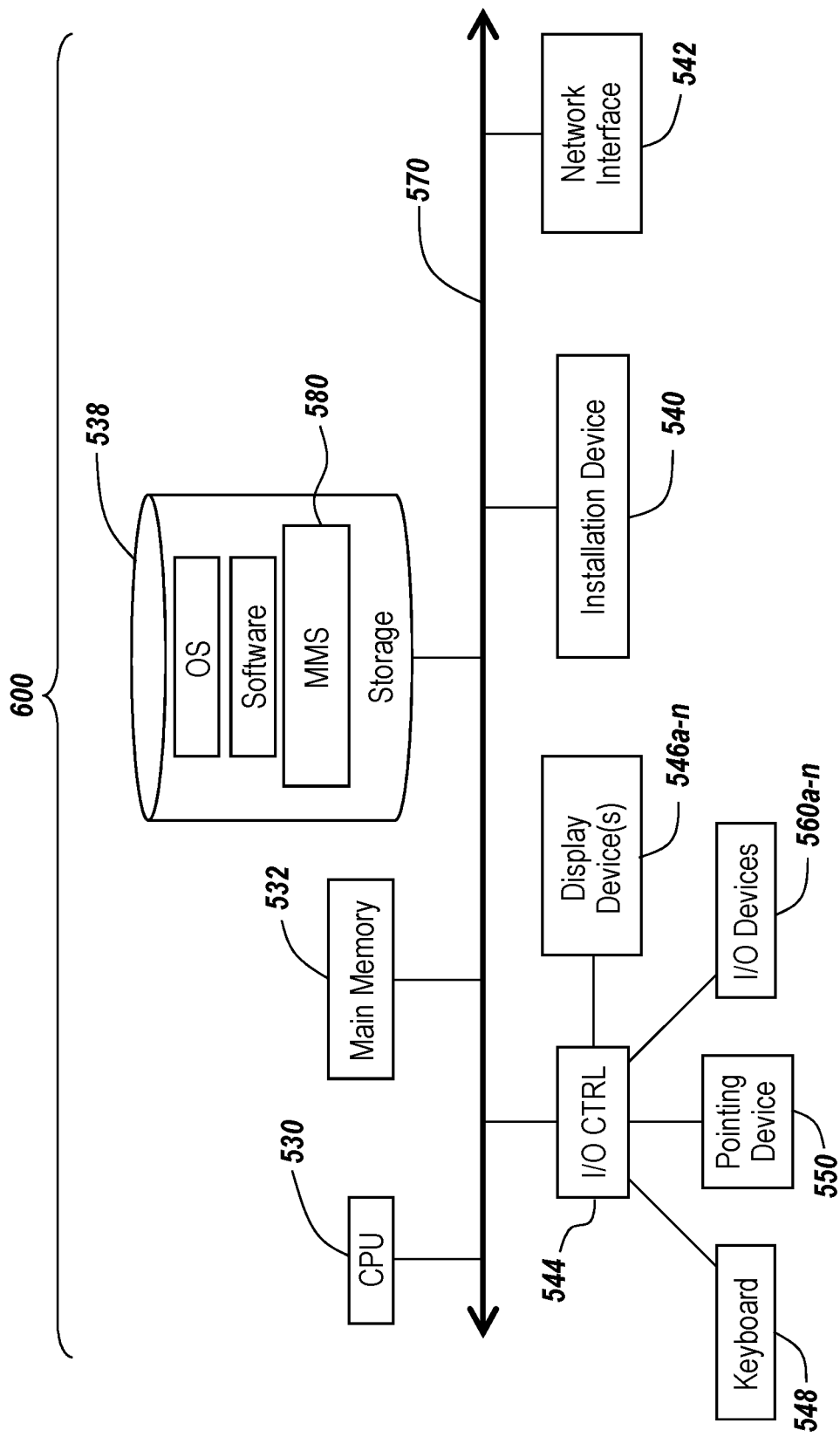
FIGS. 9 and 10 are schematic block diagrams depicting embodiments of computing devices useful for the methods and systems described herein.
Figure 10:
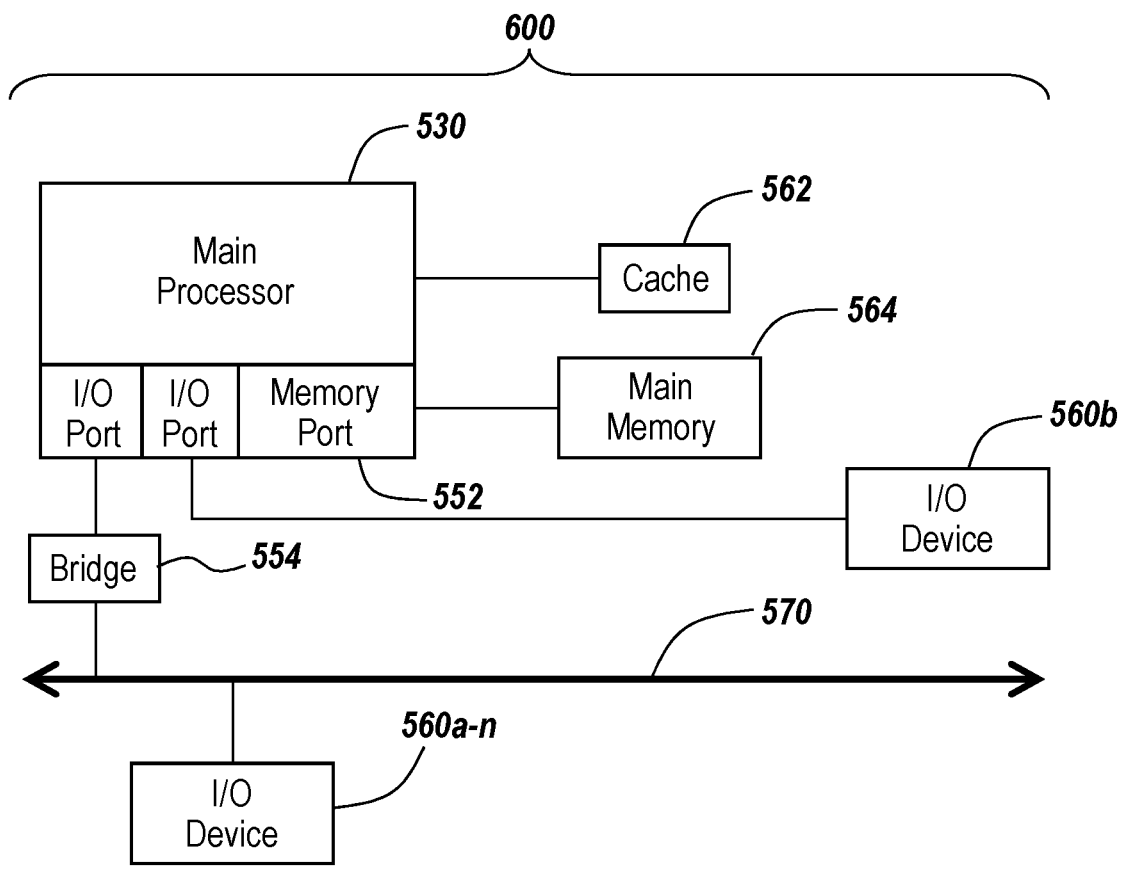

The client 512 and server 516 may be deployed as and/or executed on any type and form of computing device, such as for example a computer, network device or appliance capable of communicating on any type and form of network and performing the operations described herein. FIGS. 9 and 10 depict block diagrams of a computing device 600 useful for practicing an embodiment of the client 512 and/or a server 516, and thus by extension any unit or combination of units 12, 14, 18 and 20 of the order fulfillment system 10 of the present invention. As shown in FIGS. 9 and 10, each computing device 600 includes a central processing unit 530, and a main memory unit 532. As shown in FIG. 9, a computing device 600 may include a storage device 538, an installation device 540, a network interface 542, an I/O controller 544, display devices 546a-546n, a keyboard 548 and a pointing device 550, e.g. a mouse. The storage device 538 may include, without limitation, an operating system, and/or software. As shown in FIG. 10, each computing device 600 may also include additional optional elements, e.g. a memory port 552, a bridge 554, one or more input/output devices 560a-560n (generally referred to using reference numeral 560), and a cache memory 562 in communication with the central processing unit 530.

The central processing unit 530 is any logic circuitry that responds to and processes instructions fetched from the main memory unit 564. In many embodiments, the central processing unit 530 is provided by a microprocessor unit, e.g.:

those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 530 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit or main memory storage unit 564 may include one or more memory chips capable of storing data and allowing any storage location to be directly accessed by the processor 530. The main memory unit 564 may be volatile and faster than memory of the storage unit 538. Main memory units 564 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 564 or the storage 538 may be non-volatile, e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 564 may be based on any of the above described memory chips, or any other available memory chips capable of operating as described herein. In the embodiment shown in FIG. 9, the processor 530 communicates with main memory 532 via a system bus 570 (described in more detail below). FIG. 10 depicts an embodiment of a computing device 600 in which the processor communicates directly with main memory 564 via a memory port 552. For example, in FIG. 10 the main memory 564 may be DRDRAM. The computer executable instructions of the present invention may be provided using any computer-readable media that is accessible by the computing or electronic device 600. Computer-readable media may include, for example, the computer memory or storage unit 564, 538 described above. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 564, 538 is shown within the computing device 600 it will be appreciated that the storage may be distributed or located remotely and accessed via a network or other communication link.

FIG. 10 depicts an embodiment in which the main processor 530 communicates directly with cache memory 562 via a secondary bus, sometimes referred to as a backside bus. In other embodiments, the main processor 530 communicates with cache memory 562 using the system bus 570. Cache memory 562 typically has a faster response time than main memory 564 and is typically provided by SRAM, B SRAM, or EDRAM. In the embodiment shown in FIG. 10, the processor 530 communicates with various I/O devices 560 via a local system bus 570. Various buses may be used to connect the central processing unit 530 to any of the I/O devices 560, including a PCI bus, a PCI-X bus, or a PCI-Express bus, or a NuBus. For embodiments in which the I/O device is a video display 546, the processor 530 may use an Advanced Graphics Port (AGP) to communicate with the display 546 or the I/O controller 544 for the display 546. FIG. 10 depicts an embodiment of a computer 600 in which the main processor 530 communicates directly with I/O device 560b or other processors 530 via HYPERTRANSPORT, RAPIDIO, or INFINIBAND communications technology. FIG. 10 also depicts an embodiment in which local busses and direct communication are mixed: the processor 530 communicates with I/O device 560a using a local interconnect bus while communicating with I/O device 560b directly.

A wide variety of I/O devices 560a-560n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, and printers such as inkjet printers, laser printers, and 3D printers.

Devices 560a-560n may include a combination of multiple input or output devices, including, e.g., Microsoft KINECT, Nintendo Wiimote for the WII, Nintendo WII U GAMEPAD, or Apple IPHONE. Some devices 560a-560n allow gesture recognition inputs through combining some of the inputs and outputs. Some devices 560a-560n provides for facial recognition which may be utilized as an input for different purposes including authentication and other commands. Some devices 560a-560n provides for voice recognition and inputs, including, e.g., Microsoft KINECT, SIRI for IPHONE by Apple, Amazon Alexa, Google Now or Google Voice Search.

Additional devices 560a-560n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXEL SENSE or Multi-Touch Collaboration Wall, may have larger surfaces, such as on a table-top or on a wall, and may also interact with other electronic devices. Some I/O devices 560a-560n, display devices 546a-546n or group of devices may be augment reality devices. The I/O devices may be controlled by an I/O controller 44 as shown in FIG. 9. The I/O controller may control one or more I/O devices, such as, e.g., a keyboard 548 and a pointing device 550, e.g., a mouse or optical pen. Furthermore, an I/O device may also provide storage and/or an installation medium 540 for the computing device 600. In still other embodiments, the computing device 600 may provide USB connections (not shown) to receive handheld USB storage devices. In further embodiments, an I/O device 560 may be a bridge between the system bus 570 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 546a-546n may be connected to I/O controller 544. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 546a-546n may also be a head-mounted display (HMD). In some embodiments, display devices 546a-546n or the corresponding I/O controllers 544 may be controlled through or have hardware support for OPENGL or DIRECTX API or other graphics libraries.

In some embodiments, the computing device 600 may include or connect to multiple display devices 546a-546n, which each may be of the same or different type and/or form. As such, any of the I/O devices 560a-560n and/or the I/O controller 544 may include any type and/or form of suitable hardware, software, or combination of hardware and software to support, enable or provide for the connection and use of multiple display devices 546a-546n by the computing device 600. For example, the computing device 600 may include any type and/or form of video adapter, video card, driver, and/or library to interface, communicate, connect or otherwise use the display devices 546a-546n. In one embodiment, a video adapter may include multiple connectors to interface to multiple display devices 546a-546n. In other embodiments, the computing device 600 may include multiple video adapters, with each video adapter connected to one or more of the display devices 546a-546n. In some embodiments, any portion of the operating system of the computing device 600 may be configured for using multiple displays 546a-546n. In other embodiments, one or more of the display devices 546a-546n may be provided by one or more other computing devices 600a or 600b connected to the computing device 600, via the network 514. In some embodiments software may be designed and constructed to use another computer's display device as a second display device 546a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 546a-546n.

Referring again to FIG. 9, the computing device 600 may comprise a storage device 538 (e.g. one or more hard disk drives or redundant arrays of independent disks) for storing an operating system or other related software, and for storing application software programs such as any program related to the software 580 for the order fulfillment system 10 of the present invention. Examples of storage devices 538 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 538 may be non-volatile, mutable, or read-only. The storage device 538 may be internal and connect to the computing device 600 via a bus 570. Further, the storage device 538 may be external and connect to the computing device 600 via an I/O device 560 that provides an external bus. Some storage devices 538 may connect to the computing device 600 via the network interface 542 over a network 514, including, e.g., the Remote Disk for MACBOOK AIR by Apple. Some client devices 512 may not require a non-volatile storage device 538 and may be thin clients or zero clients 512. The storage device 538 may also be used as an installation device 540, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

The computing device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon App-store for Android OS and KINDLE FIRE provided by Amazon.com, Inc. An application distribution platform may facilitate installation of software on a client device 512. An application distribution platform may include a repository of applications on a server 516 or a cloud 520, which the clients 512a-512n may access over a network 514. An application distribution platform may include application developed and provided by various developers. A user of a client device 512 may select, purchase and/or download an application via the application distribution platform.

Furthermore, the computing device 600 may include a network interface 542 to interface to the network 514 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 542 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

The computing device 600 of the sort depicted in FIG. 9 may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOK S.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is an eBook reader, e.g. the KINDLE family of devices by Amazon.com, or NOOK family of devices by Barnes & Noble, Inc. of New York City, N.Y.

In some embodiments, the computing device 600 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the computing device 600 is a laptop or desktop computer equipped with a web browser and a microphone and speaker system, e.g. a telephony headset. In these embodiments, the computing devices 600 are web-enabled and can receive and initiate phone calls. In some embodiments, a laptop or a desktop computer is also equipped with a webcam or other video capture device that enables video chat and video call. In some embodiments, the computing device 600 is a wearable mobile computing device including but not limited to Google Glass and Samsung Gear.

In some embodiments, the status of one or more machines 512, 516 in the network 514 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the order fulfillment system disclosed herein.

The foregoing description may provide illustration and description of various embodiments of the invention, but is not intended to be exhaustive or to limit the invention to the precise form disclosed. Modifications and variations of the order fulfillment system of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

It is intended that the invention not be limited to the particular embodiments disclosed above, but that the invention will include any and all particular embodiments and equivalents falling within the scope of the following appended claims.

We claim:

1. A customer order fulfillment system, comprising
an order collection unit for collecting information associated with a plurality of customer orders from a plurality of customers and generating customer order data that includes data associated with each of the plurality of customer orders and the plurality of customers, wherein each of the plurality of customer order includes one or more items associated therewith,
an order generating unit for receiving the customer order data from the order collection unit and generating in response thereto consolidated order fulfillment data,
a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, and
a pick tour generating unit for receiving the consolidated order fulfillment data from the order generating unit and for generating pick tour instructions associated with a pick tour from the consolidated order fulfillment data, wherein the pick tour instructions selectively includes the bulk picks,
wherein the bulk pick order fulfillment unit groups selected ones of the items of the plurality of customer orders in the consolidated order fulfillment data into the bulk picks based on a plurality of selectable predetermined logical parameters, including warehouse data and data associated with the items that are common among a selected group of items, so as to optimize a fulfillment process, and
wherein the bulk pick order fulfillment unit includes processing hardware that is configured to generate one or more bulk picks having associated therewith a plurality of bulk pick recipes from the data associated with the customer orders and the warehouse data including one or more locations in the warehouse, wherein each of the bulk pick recipes includes a selected quantity of different ones of the one or more items from different ones of the plurality of customer orders that are grouped together.

2. The customer order fulfillment system of claim 1, wherein the bulk pick order fulfillment unit includes processing hardware that is configured to
generate a bulk pick ticket associated with each of the bulk picks, wherein the bulk pick ticket includes information about the one or more items in the bulk pick recipe, including a description of the item, and image of the item and a number of the items to be selected, and the location of the item in the warehouse.

3. The customer order fulfillment system of claim 1, wherein the bulk pick order fulfillment unit generates the one or more bulk pick recipes by using a connected graph of groupings of the items from the customer orders and one or more additional items, wherein the items from the customer orders and the additional items form nodes of the connected graph, and wherein the connected graph includes a plurality of connecting lines coupled to one or more of the nodes and which are representative of a number of the customers associated with the nodes that are connected by the connecting lines.

4. The customer order fulfillment system of claim 3, wherein one of the order generating unit and the bulk pick order fulfillment unit generates a window having a tree map for visually displaying on a display device selected consolidated order fulfillment data.

5. The customer order fulfillment system of claim 4, wherein the window includes
a top pane for displaying the selectable logical parameters for allowing a user to select parameters associated with the customer orders, and wherein the selectable parameters include a plurality of a selectable warehouse location, a maximum number of items per bulk pick ticket, a minimum shipment count per bulk pick recipe, a maximum number of recipes per bulk pick, a selectable fulfillment line type, and a selectable pick location, wherein each of the recipes includes a selected number of items from the customer orders,
a plurality of bottom panes forming the tree map, wherein each of the plurality of bottom panes is representative of a total number of customer orders included in a bulk pick, and wherein each of the plurality of bottom pane elements has a different size relative to each other and is representative of a different number of bulk picks, wherein the plurality of bottom panes are arranged in order of the number of bulk picks.

6. The customer order fulfillment system of claim 5, wherein the processing hardware is configured to group items in the customer orders into bulk picks for shipment based on a plurality of logical rules, wherein the plurality of logical rules includes payment status of the customer rule, destination address of the customer rule, one or more services associated with one or more items in the customer order rule including sizing of the item and appraisal of the item, and a shipping option rule.

7. The customer order fulfillment system of claim 6, wherein the processing hardware is configured to schedule the bulk pick tour based on a plurality of logical rules including time of day, a number of customer orders, and a number of pick agents assigned to the warehouse.

8. The customer order fulfillment system of claim of claim 3, wherein the processing hardware of the bulk pick order fulfillment unit is further configured to allow a user to select a maximum number of recipes per bulk pick, a maximum number of items per bulk pick and a minimum number of bulk groups per bulk pick, and wherein the bulk pick order fulfillment unit determines a number of items per bulk pick recipe and a total number of bulk picks.

9. The customer order fulfillment system of claim 1, further comprising an automated fulfillment sub-system for automatically retrieving the items that form the bulk pick or that form the pick tour.

10. The customer order fulfillment system of claim 1, further comprising a packing and shipping sub-system for packing and shipping the items from the customer orders.

11. A computer-implemented method, comprising
collecting information associated with a plurality of customer orders from a plurality of customers and generating customer order data that includes data associated with each of the plurality of customer orders and the plurality of customers, wherein each of the plurality of customer order includes one or more items associated therewith,
generating in response to the customer order data consolidated order fulfillment data,
grouping together similar ones of the items associated with the plurality of customer orders to form a plurality of bulk picks based on a plurality of selectable logical parameters, including warehouse data and data associated with the items that are common among a selected group of items so as to optimize a fulfillment process, wherein one or more of the plurality of bulk picks can form part of one or more bulk pick tours,
generating one or more bulk picks having associated therewith a plurality of bulk pick recipes from the data associated with the customer orders and the warehouse data including one or more locations in the warehouse, wherein each of the bulk pick recipes includes a selected quantity of different ones of the one or more items from the plurality of customer orders that are grouped together, and
generating pick tour instructions associated with a pick tour from the consolidated order fulfillment data.

12. The computer-implemented method of claim 11, further comprising
generating a bulk pick ticket associated with each of the bulk picks, wherein the bulk pick ticket includes information about the one or more items in the bulk pick recipe, including a description of the item, and image of the item and a number of the item to selected, and the location of the item in the warehouse.

13. The computer-implemented method of claim 11, further comprising generating the one or more bulk pick recipes using a connected graph of groupings of the items from the customer orders and the one or more additional items, wherein the items from the customer orders and the additional items form nodes of the connected graph, and wherein the connected graph includes a plurality of connecting lines coupled to the nodes and which are representative of a number of the items in a plurality of the customer orders.

14. The computer-implemented method of claim 13, further comprising generating a window having a tree map for visually displaying on a display device selected consolidated order fulfillment data.

15. The computer-implemented method of claim 14, wherein the window comprises
a top pane having the selectable logical parameters for allowing a user to select parameters associated with the customer orders, and wherein the selectable parameters include a selectable warehouse location, a maximum number of items per bulk pick ticket, a minimum shipment count per bulk pick recipe, and a maximum number of recipes per bulk pick, a selectable fulfillment line type, and a selectable pick location, wherein each of the recipes includes a selected number of items from the customer orders,
a plurality of bottom panes forming the tree map, wherein each of the plurality of bottom panes is representative of a total number of customer orders included in a bulk pick, and wherein each of the plurality of bottom pane elements has a different size relative to each other and is representative of a different number of bulk picks, wherein the plurality of bottom panes are arranged in order of the number of bulk picks.

16. The computer-implemented method of claim 15, further comprising grouping items in the customer orders into bulk picks for shipment based on a plurality of logical rules, wherein the plurality of logical rules includes payment status of the customer rule, destination address of the customer rule, one or more services associated with one or more items in the customer order rule including sizing of the item and appraisal of the item, and a shipping option rule.

17. The computer-implemented method of claim 16, further comprising scheduling the bulk pick tour based on a plurality of logical rules including time of day, a number of customer orders, and a number of pick agents assigned to the warehouse.

18. The computer-implemented method of claim 13, further comprising selecting a maximum number of recipes per bulk pick, a maximum number of items per bulk pick and a minimum number of bulk groups per bulk pick, and determining a number of items per bulk pick recipe and a total number of bulk picks.

* * * * *